UNITED STATES PATENT OFFICE.

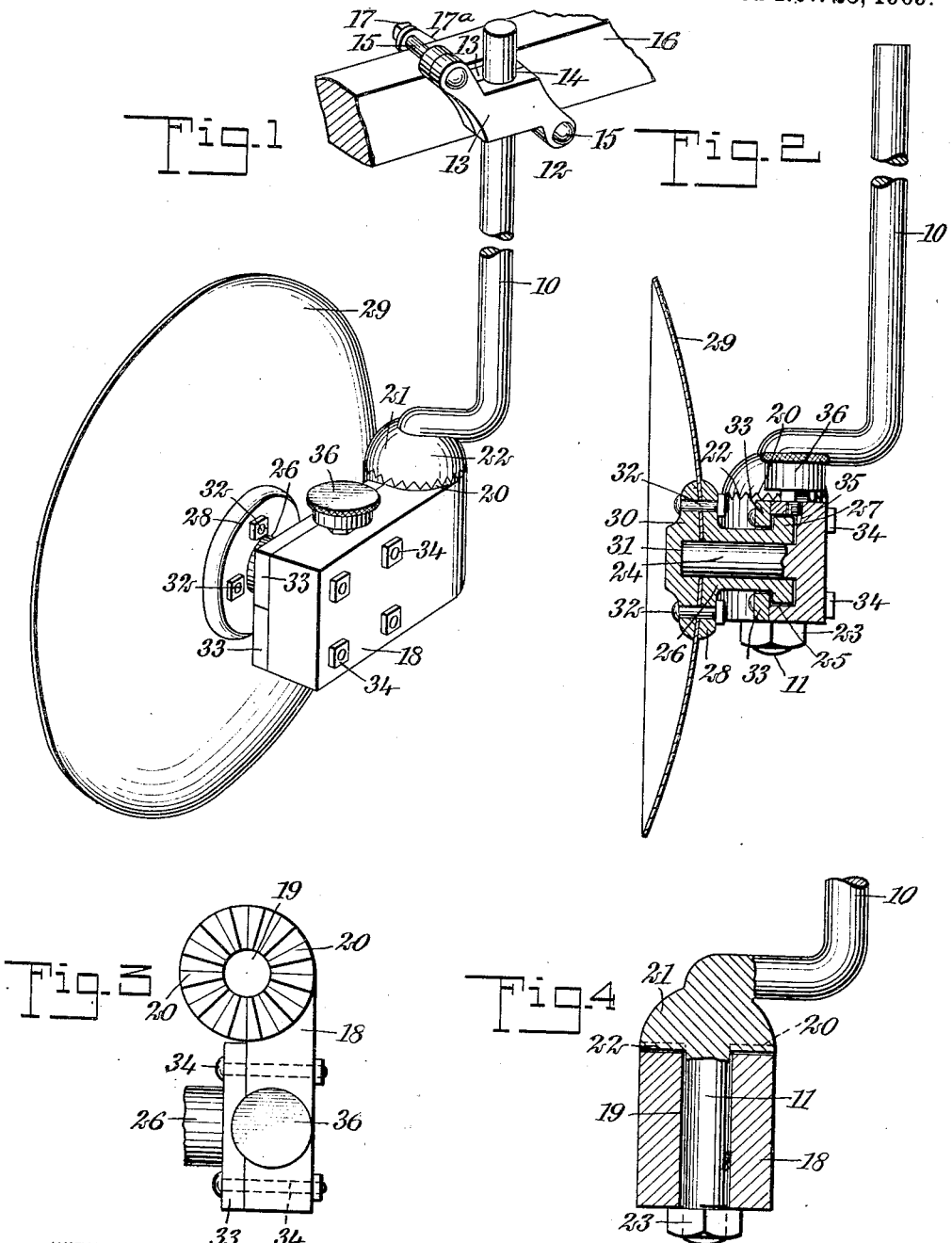
A. C. DITMAR.
JOURNAL FOR AGRICULTURAL IMPLEMENTS.
APPLICATION FILED NOV. 10, 1908.
941,191.
Patented Nov. 23, 1909.
WITNESSES
INVENTOR
Arch C. Ditmar
BY
ATTORNEYS

ARCHIE CLYDE DITMAR, OF DAVENPORT, WASHINGTON.

JOURNAL FOR AGRICULTURAL IMPLEMENTS.

941,191.  Specification of Letters Patent.  Patented Nov. 23, 1909.

Application filed November 10, 1908. Serial No. 461,874.

*To all whom it may concern:*

Be it known that I, ARCHIE C. DITMAR, a citizen of the United States, and a resident of Davenport, in the county of Lincoln and State of Washington, have invented a new and Improved Journal for Agricultural Implements, of which the following is a full, clear, and exact description.

This invention relates to journals for plows and the like, and more particularly to a device of this class comprising a bracket adapted to be secured to the plow beam or the like in a plurality of positions so that the angle of the bracket can be varied, the bracket having a spindle, a hub mounted rotatably upon the spindle, a colter disk or other part to be revolubly mounted rigid with the hub, and means for movably securing the hub to the bracket, means further being provided for supplying lubricant to the spindle.

The object of the invention is to provide a simple, inexpensive and efficient journal which can be attached to a plow beam or the like for the purpose of revolubly mounting a colter disk or other part, in which the colter disk can be set at any desired angle, which will fit any kind of plow, in which the spindle is in a dust-proof boxing or housing, and in which the wearing parts are supplied with lubricant.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a perspective view of an embodiment of my invention, showing the same attached to a plow beam; Fig. 2 is a longitudinal section of the device; Fig. 3 is a plan view of the bracket the shank being removed; and Fig. 4 is an enlarged longitudinal section showing the means for securing the bracket to the shank.

Before proceeding to a more detailed explanation of my invention, it should be clearly understood that the same can be applied to different kinds of agricultural implements and can be used with a furrow opener or a colter for turning into the furrow weeds, stubble or the like on the surface of the ground. The shank or supporting member for the colter is secured to the plow beam by means of a special clip which permits the device to be easily applied to and removed from the plow. The colter disk rotates upon a spindle which is protected in a boxing or housing formed by the adjacent parts, so that no dust, dirt, sand or the like can come in contact with the spindle to scar or mark the same or to interfere with the operation of the colter. I provide a cup for hard oil or grease, so that the wearing parts can be constantly provided with lubricant. The device can be used for other purposes to which journals are put.

Referring more particularly to the drawings, I employ a shank 10 preferably of circular cross section and having the lower end 11 laterally offset. The shank is secured to the plow beam by means of the clip 12 which comprises the similar members 13 which have rounded grooves or recesses 14 adapted to register to form the clip opening which receives the shank 10. The grooves are oblique with respect to the length of the members 13. At the ends the members have registering openings which receive the bolts 15 joined by the bar 17ª which extends across the plow beam 16 and holds the parts together, being secured in place by nuts 17. It will be understood that by tightening the nuts upon the bolts the clip members are forced together to hold the shank in place, and at the same time the clip is securely attached to the plow beam.

I provide a bracket 18 having at one end a bore 19 formed to receive the end 11 of the shank 10 and provided at the upper surface surrounding the bore 19 with radial teeth or serrations 20. The shank 10 has an extension 21 substantially circular in form and provided with radial teeth or serrations 22 surrounding the end 11 and adapted to engage the teeth 20 to hold the bracket against rotation with respect to the shank. The lower end of the shank is threaded and carries a nut 23 by means of which it can be locked in position with respect to the bracket. The latter has a laterally extending spindle 24 preferably integral therewith. The spindle is surrounded by a substantially circular recess 25 which is formed to receive the end of a hub 26, the latter being laterally extended to form a substantially circular flange 27 which is positioned within the recess. The end of the hub remote from the flange 27 is laterally extended to form an annular flange 28 against which the colter disk 29 rests. The latter is of any preferred or common form and may for example, be concaved as shown most clearly in Fig. 2. The flange 28 is shaped to conform to the curvature of the colter disk. A cap 30 having a recess 31 to receive the end of the spindle 24 which projects through a substantially central opening of the disk, is positioned at the side of the disk remote from the flange 28. Bolts or rivets 32 located in registering openings of the cap 30, the colter disks 29 and the flange 28, serve to secure these parts firmly and rigidly together.

Keepers 33 are positioned at the brackets and extend over the recess 25, movably engaging the flange 27 to hold the hub rotatably in position upon the spindle 24. The keepers have openings therethrough which register with corresponding openings of the bracket and which receive bolts 34, the latter serving to hold the keepers in place.

The bracket in the upper part has a passage 35 therethrough into which projects the threaded end of an oil or grease cup 36. The passage 35 permits lubricant to flow from the cup 36 through the recess 35 to the spindle.

Having thus described my invention, I claim as new and desire to secure by Letters Patent:

1. A journal comprising a bracket having at one end a vertical opening to receive a supporting shank and provided with a lateral spindle projecting from one side adjacent to its other end and in said side with a recess surrounding the spindle, a hub mounted to revolve on the spindle and adapted to carry a part revoluble with the hub, said hub having a flanged inner end in the recess of the bracket, and keepers detachably secured upon the recessed side of the bracket and extending over the said recess.

2. A journal, comprising a bracket having a vertical opening at one end to receive a supporting shank and provided with a lateral spindle projecting from one side adjacent to its other end, a recess in said side and surrounding the spindle, and a vertical opening leading from its upper face into said recess, a hub mounted to revolve on the spindle and adapted to carry a part revoluble therewith, said hub having a flange at its end fitting in the recess of the bracket, keepers on the recessed side of the bracket and extending over the said recess, bolts passing through the keepers and bracket, and a lubricant cup secured in the opening of the bracket leading to the recess.

In testimony whereof I have signed my name to this specification in the presence of two subscribing witnesses.

ARCH. CLYDE DITMAR.

Witnesses:
A. J. HUCK,
M. B. JARVIS.